United States Patent
Petrov et al.

(10) Patent No.: US 7,661,066 B2
(45) Date of Patent: Feb. 9, 2010

(54) VISUAL ADMINISTRATOR PROVIDING JAVA MANAGEMENT BEAN SUPPORT

(75) Inventors: Miroslav R Petrov, Sofia (BG); Georgi Z. Shirkov, Sofia (BG); Gregor Karl Frey, Lorsch (DE); Reinhold Kautzleben, Karlsrube (DE)

(73) Assignee: SAP AG, Walldorf (DE)

( * ) Notice: Subject to any disclaimer, the term of this patent is extended or adjusted under 35 U.S.C. 154(b) by 511 days.

(21) Appl. No.: 10/814,915

(22) Filed: Mar. 26, 2004

(65) Prior Publication Data

US 2005/0216488 A1   Sep. 29, 2005

(51) Int. Cl.
G06F 15/177 (2006.01)

(52) U.S. Cl. .................. 715/736; 715/737; 715/738; 715/739; 715/740; 709/218; 709/219; 709/224; 709/225; 719/316; 719/317

(58) Field of Classification Search .................. 715/736, 715/737, 738, 739, 740; 709/202, 203, 205, 709/217, 218, 219, 224, 225; 719/316, 317; 714/1–57
See application file for complete search history.

(56) References Cited

U.S. PATENT DOCUMENTS

| | | | |
|---|---|---|---|
| 6,061,721 A | 5/2000 | Ismael et al. | |
| 6,336,118 B1 * | 1/2002 | Hammond | 707/103 Y |
| 6,356,931 B2 * | 3/2002 | Ismael et al. | 709/202 |
| 7,086,065 B1 * | 8/2006 | Yeluripati et al. | 719/311 |
| 2001/0005201 A1 | 6/2001 | Digiorgio et al. | |
| 2002/0091819 A1 | 7/2002 | Melchione et al. | |
| 2002/0112044 A1 * | 8/2002 | Hessmer et al. | 709/223 |
| 2003/0069969 A1 * | 4/2003 | Renaud | 709/225 |
| 2004/0019639 A1 * | 1/2004 | E et al. | 709/205 |
| 2004/0019662 A1 * | 1/2004 | Viswanath et al. | 709/220 |
| 2004/0078722 A1 * | 4/2004 | Pfeiffer et al. | 714/47 |
| 2004/0194066 A1 * | 9/2004 | Frey et al. | 717/127 |
| 2005/0198285 A1 * | 9/2005 | Petit | 709/225 |
| 2005/0216860 A1 * | 9/2005 | Petrov et al. | 715/810 |

* cited by examiner

*Primary Examiner*—Weilun Lo
*Assistant Examiner*—Rashedul Hassan
(74) *Attorney, Agent, or Firm*—Blakely Sokoloff Taylor & Zafman

(57) ABSTRACT

A method, apparatus, and system are provided for a visual administrator providing Java management bean (MBean) support. According to one embodiment, a representation of a plurality of MBeans is displayed on a graphical user interface of a computing device. One of the plurality of MBeans may be selected with the graphical user interface. In an embodiment, an attribute of the selected MBean is accessed with the graphical user interface. In an embodiment, an operation of the selected MBean is invoked with the graphical user interface.

26 Claims, 12 Drawing Sheets

VISUAL ADMINISTRATOR PROVIDING JAVA MANAGEMENT BEAN SUPPORT

TECHNICAL FIELD

Embodiments of the invention generally relate to the field of system resource monitoring and more particularly, to a visual administrator providing Java management bean support.

BACKGROUND

Many businesses are providing access to their products and services through computer networks. The Java 2 Enterprise Edition Specification v1.3, published on Jul. 27, 2001 (the J2EE Standard) defines an increasingly popular architecture for the server-side of enterprise computer networks. As these computer networks become more complex, there is an increased need for improved administration, monitoring, and management of enterprise computer networks.

An emerging standard, JSR-000003 Java Management eXtensions (JMX), version 1.2 (hereinafter, the JMX Specification), provides a standardized way to manage arbitrary Java resources in enterprise computer networks. The JMX Specification describes a management architecture, an Application Program Interface (API), and a number of services for Java enabled applications. Together, these elements provide a standardized way to manage arbitrary Java resources.

FIG. 1 is a block diagram of selected elements of the management architecture defined by the JMX Specification. The JMX management architecture primarily consists of instrumentation level 110 and agent level 120. Instrumentation level 110 includes Java management beans (or simply, MBeans) 112 and 114. An MBean is a Java object that represents a manageable resource, such as an application, a service, a component, or a device. An MBean provides a management interface that consists of attributes and operations that are exposed for management purposes. The term "attribute" refers to a value (or characteristic) of an object. The term "operation" refers to a process that an object performs.

Agent level 120 includes MBean server 124. MBean server 124 provides a registry for MBeans 112 and 114 and also an interface between registered MBeans and distributed services level 130. Management applications (e.g., in distributed services level 130) may access services provided by MBean server 124 to manipulate MBeans 112 and 114. The services provided by MBean server 124 may be defined by the JMX Specification and may include a monitoring service, a timer service, and a relation service for registered MBeans. Non-java objects may also register with MBean server 124 if they have a Java wrapper. The term "Java wrapper" refers to data that proceeds or frames a non-Java resource so that the non-Java resource can interface with a Java resource.

Distributed services level 130 provides an interface between management applications (not shown) and MBean server 124. Management applications may connect to MBean server 124 through a variety of means including connector 132 and protocol adaptor 134. Connector 132 may provide an interface to management applications that complies with the JMX Specification or it may provide an interface for proprietary management applications. Protocol adaptor 134 translates operations between MBean server 124 and well-known protocols such as, Request For Comments (RFC) 2617 entitled, "HyperText Transport Protocol (HTTP) Authentication: Basic and Digest Access Authentication," June 1999 (Hereinafter, the HTTP Protocol). The JMX Specification, however, does not provide a mechanism to change attributes and/or execute operations on MBeans with a graphical user interface.

SUMMARY OF THE INVENTION

A method, apparatus, and system are provided for a visual administrator providing Java management bean (MBean) support. According to one embodiment, a representation of a plurality of MBeans is displayed on a graphical user interface of a computing device. One of the plurality of MBeans may be selected with the graphical user interface. In an embodiment, an attribute of the selected MBean is accessed with the graphical user interface. In an embodiment, an operation of the selected MBean is invoked with the graphical user interface.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are directed to a visual administrator providing Java management bean (MBean) support. According to one embodiment, a representation of a plurality of MBeans is displayed on a graphical user interface of a computing device. One of the plurality of MBeans may be selected with the graphical user interface. In an embodiment, an attribute of the selected MBean is accessed with the graphical user interface. In an embodiment, an operation of the selected MBean is invoked with the graphical user interface.

Figure 2:
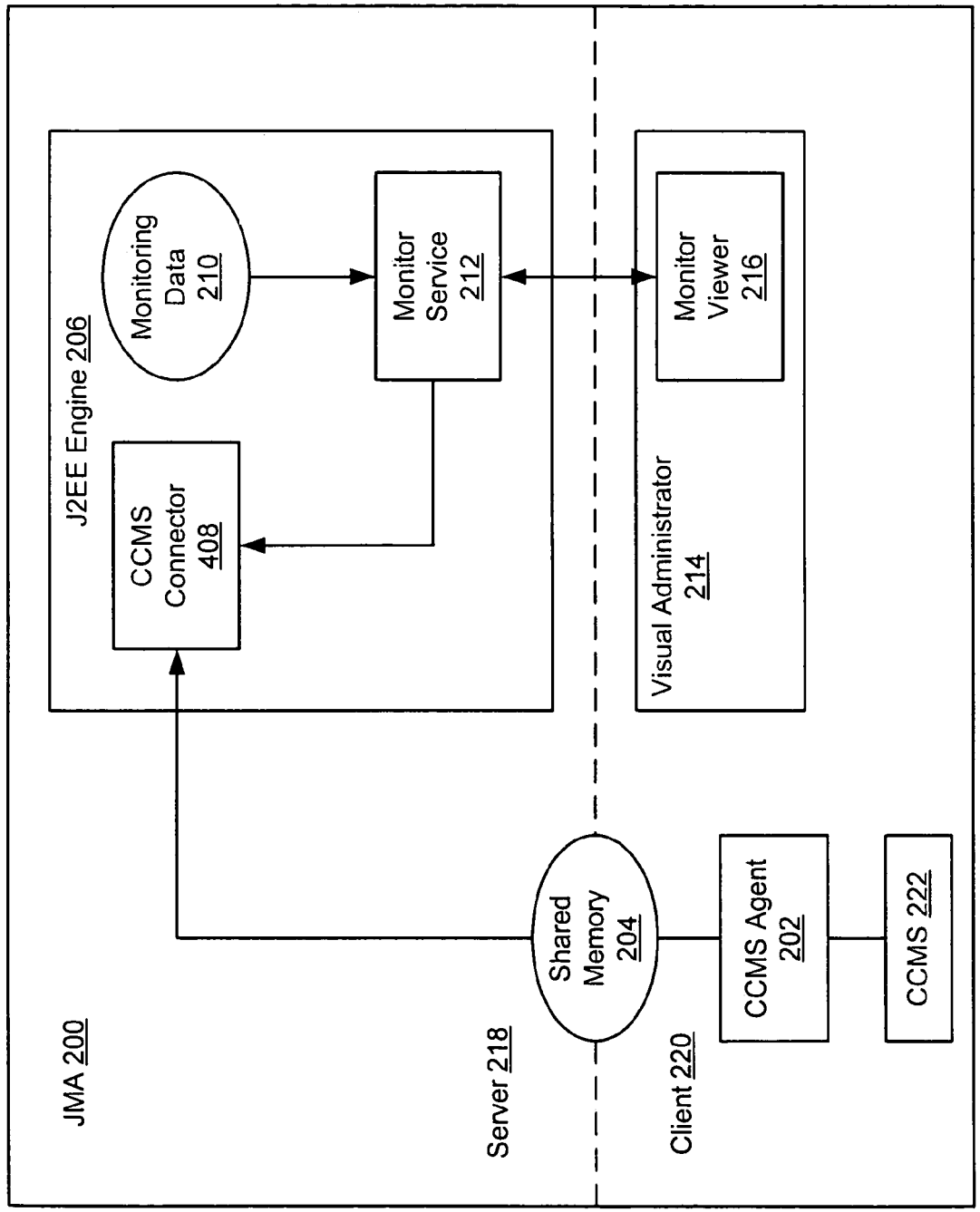
FIG. 2 is a block diagram illustrating an embodiment of Java monitoring architecture 200.

FIG. 2 illustrates one embodiment of the invention implemented within a JMX-based Java monitoring architecture (JMA) 200 for administration and management of Java 2

Platform, Enterprise Edition ("J2EE") engine 206. According to one embodiment, the administration and management of the resources associated with J2EE engine 206 may include monitoring of various system resources, including Java resources and other resources associated with J2EE engine 206. Examples of monitored resources include, and are not limited to: the kernel, services, interfaces, libraries for each of the dispatchers and servers, network connections, memory consumption, threads, classloaders, database connections, database transactions, HyperText Transport Protocol ("HTTP") cache, Java Messaging Service ("JMS") queries and topics, sessions, and the like. In an embodiment, a monitoring service, such as the monitoring service 212 may be used to monitor system resources.

According to one embodiment, monitor service 212 may gather and maintain data related to monitored resources such as monitoring data 210. Monitoring data 210 may provide a history of monitoring data which may be used to provide alerts when various resources, such as parameters, applications, or components reach a critical state. In an embodiment, the features of JMA 200 may enabled or disabled depending on administrative commands provided by, for example, visual administrator 214.

According to one embodiment, JMA 200 may include monitoring service 212 and one or more JMX-based monitor servers (JMX monitors). Monitoring service 212 may help establish a connection between a JMX monitor and the various components of JMA 200. In one embodiment, the JMX monitors may reside and work on separate or remote Java virtual machines (JVMs) to collect data from cluster elements, and report information and statistics regarding the cluster nodes and their components to, for example, visual administrator 214 having a monitor viewer 216, and/or to CCMS 222 via CCMS agent 202, and to various other third party tools. CCMS 222, visual administrator 214, and other third party tools may reside generally on client side 220, while other components, as illustrated, may reside on server side 218.

Figure 3:
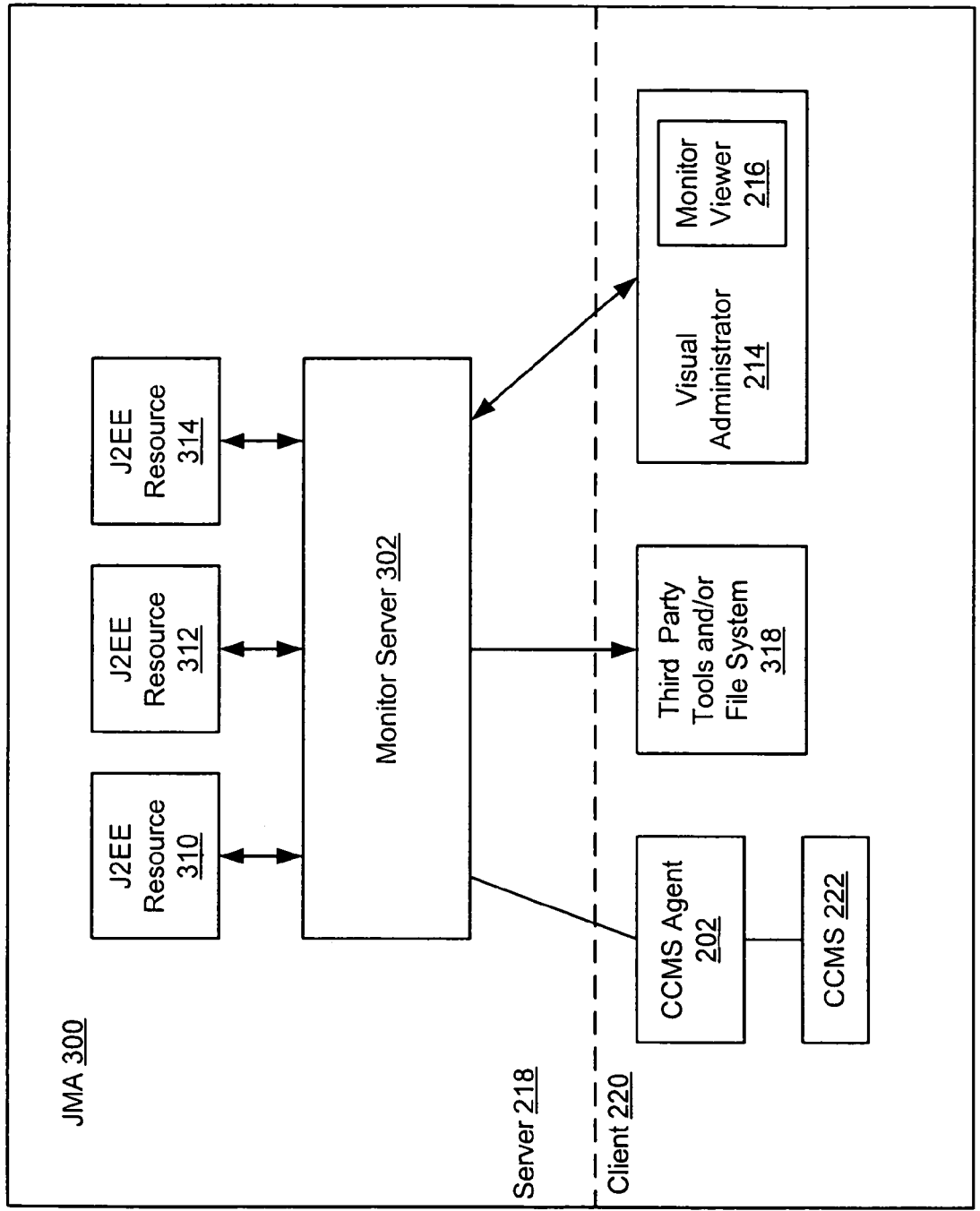
FIG. 3 is a block diagram illustrating an embodiment of Java monitoring architecture 300.

FIG. 3 illustrates an embodiment of the invention employed within a Java monitoring architecture ("JMA") 300. The illustrated embodiment includes monitor server 302 comprised of JMX-based monitors (or simply, JMX monitors) to, for example, monitor and collect data from various cluster elements and resources 310-314 of an application server engine. In one embodiment the application server engine is a Java 2 Platform, Enterprise Edition (J2EE) engine (e.g., J2EE engine 206, shown in FIG. 2). The underlying principles of the invention, however, are not tied to any particular specification or set of specifications. According to one embodiment, monitor server 302 reports or transmit the collected data to various client-side 220 components and/or applications, such visual administrator 214 having monitor viewer 216. Monitor viewer 216 may be used to enable viewing of the monitoring data received from monitor server 302.

The data collected may include information and statistics related to, for example, applications, server parameters, cluster nodes and their components of the J2EE engine. According to one embodiment, the collected data may also be reported to CCMS 222 via CCMS agent 202, and/or to third party tools 318. In one embodiment, third party tools 318 include a file system to, for example, temporarily store the collected data in a specified file format, for example, an Extensible Markup Language ("XML") format or a HyperText Markup Language ("HTML") format. The collected data may subsequently be reported to the components on client-side 220 (e.g., in an XML or HTML format).

According to one embodiment, the expected overhead of JMA 300 may vary according to its functionality. For example, the overhead may be light when reporting to CCMS 222 or third party tools 318, as opposed to when reporting to visual administrator 214. Furthermore, the larger the requesting and/or reporting interval of monitor server 302, the smaller the expected overhead may be. The expected overhead may be relatively higher when using monitor viewer 216 to actively retrieve and view the monitoring data.

Figure 4:
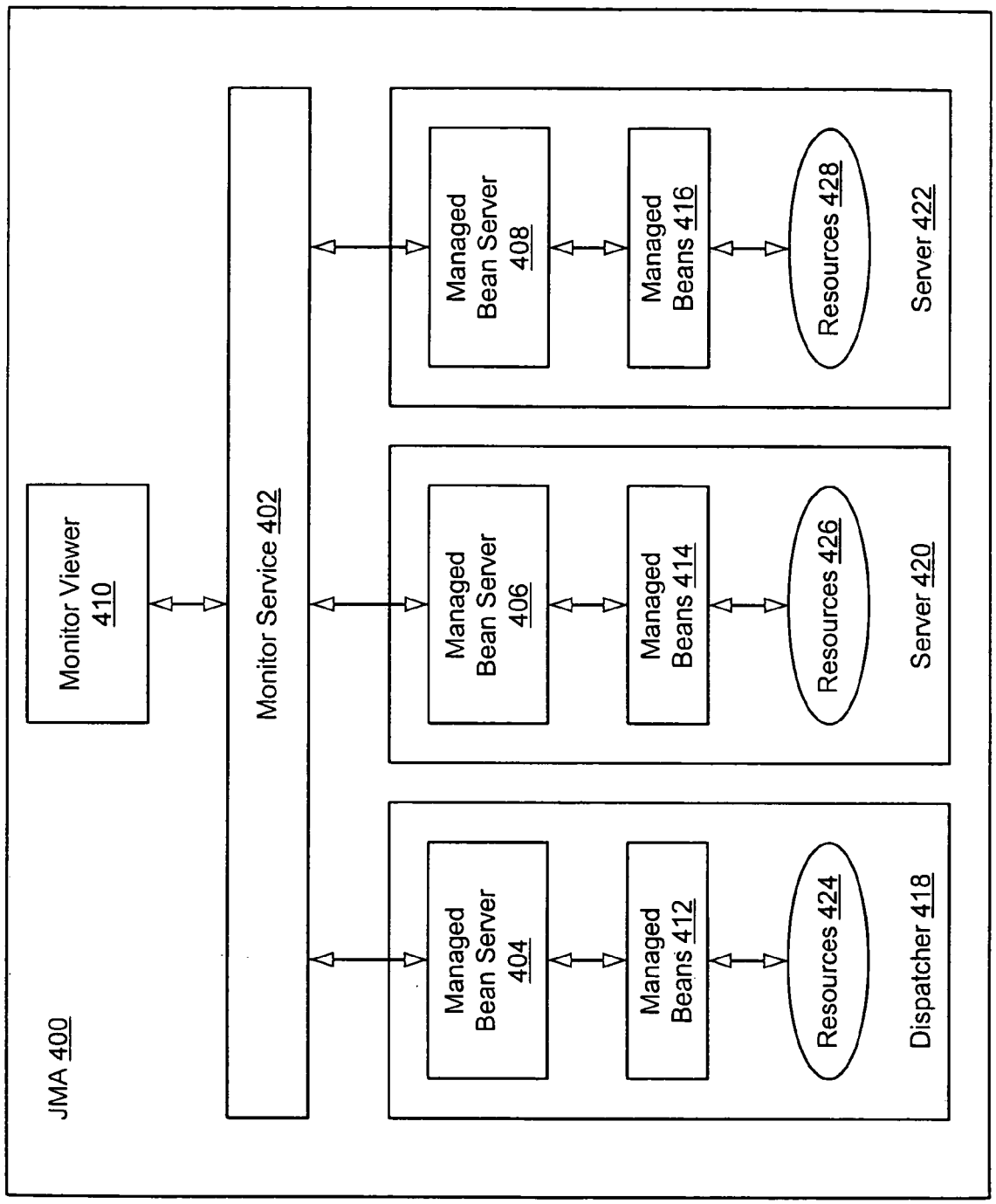
FIG. 4 is a block diagram illustrating an embodiment of Java monitoring architecture 400.

FIG. 4 is a block diagram illustrating an embodiment of Java monitoring architecture 400. According to one embodiment, Java monitoring architecture (JMA). 400 may include monitor service 402 to establish a connection between one or more managed bean servers (or simply, bean servers) 404-408 and the rest of JMA 400 (e.g., monitor viewer 410). Monitor viewer 410 may include a Graphical User Interface (GUI)-based monitor viewer or a monitor browser. In one embodiment, the GUI is a "Swing-based" GUI. A Swing-based GUI refers to a GUI that is based on the Swing API provided by any of the Java 2 Enterprise Edition Specifications, for example, v1.3, published on Jul. 27, 2001 (hereinafter the J2EE Standard). Monitor service 202 may include a number of components including monitor servers and interfaces.

According to one embodiment, managed beans (or simply, MBeans or beans) (e.g., runtime managed beans or resources beans 412-416) may be used to provide continuous monitoring of various resources 424-428 associated with a Java 2 Platform, Enterprise Edition (J2EE) engine. Resources 424-428 may include a kernel, services, interfaces, and libraries for dispatchers and servers, such as dispatcher 418 and servers 420-422.

Figure 5:
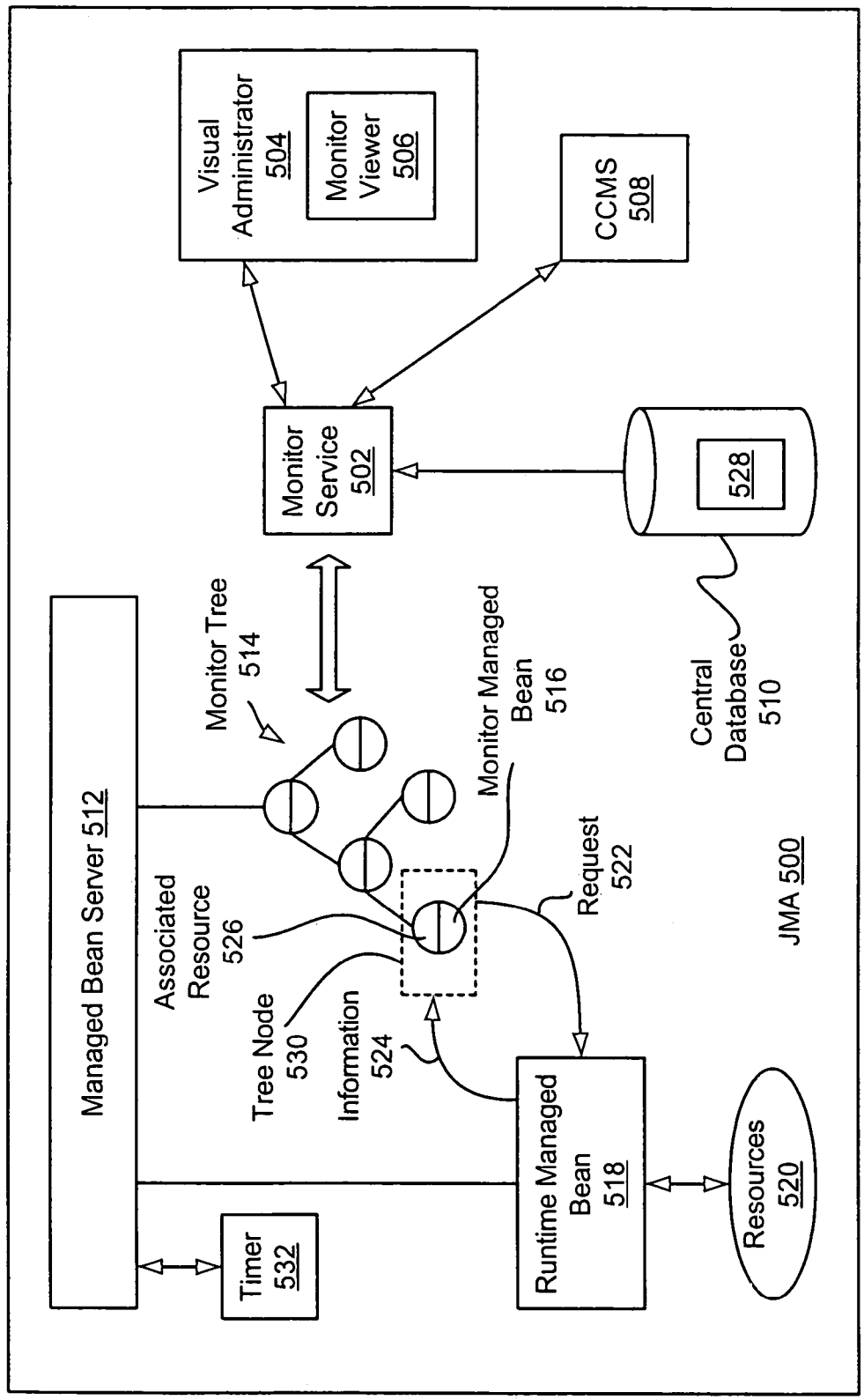
FIG. 5 is a block diagram illustrating an embodiment of a Java monitoring architecture including a monitor tree.

FIG. 5 is a block diagram illustrating an embodiment of a Java monitoring architecture including monitor tree 514. Monitoring typically refers to a periodic oversight of a process, or the implementation of an activity, which seeks to establish the extent to which input deliveries, work schedules, required actions and targeted outputs are proceeding according to plan, so that timely action can be taken to correct the deficiencies detected. According to one embodiment, Java monitoring system or architecture (JMA) 500 and its various components, including modules and servers, may be used to provide monitoring of resources and the semantics of data to ensure oversight, and may provide monitoring information to enable the proper analysis of resources 520. Furthermore, according to one embodiment, JMA 500 may provide data processing and transportation for data to various modules (e.g., monitor tree 514) and customer level components (e.g., CCMS 508, administrative tools, including a visual administrator 504, and third-party tools or plug-ins).

According to one embodiment, JMA 500 provides monitoring of a Java 2 Platform, Enterprise Edition (J2EE) engine (e.g., J2EE engine 206, shown in FIG. 2), and its associated resources 520, including but not limited to various managers, services, components, such as a kernel, interfaces, libraries for each of the dispatchers and servers, network connections, memory consumption, threads, classloaders, database connections, database transactions, HyperText Transport Protocol ("HTTP") cache, Java Messaging Service ("JMS") queues and topics, and sessions.

To monitor resources 520, JMA 500 may employ monitor service 502 having modules, servers, and/or interfaces to connect the monitoring side with the rest of JMA 500, including central database 510 and client-side applications, such as visual administrator 504 and CCMS 508. The monitoring architecture may include a managed bean server (bean server) 512, a plurality of monitor managed beans (monitor beans)

516 and/or runtime managed beans (runtime beans) 518. In one embodiment, runtime beans 518 register with bean server 512 to provide monitoring of underlying resources 520 at runtime. Bean server 512 may include a container for monitor beans 516 and runtime beans 518, to provide them access to various resources 520 and management applications 504, 508.

Figure 1:
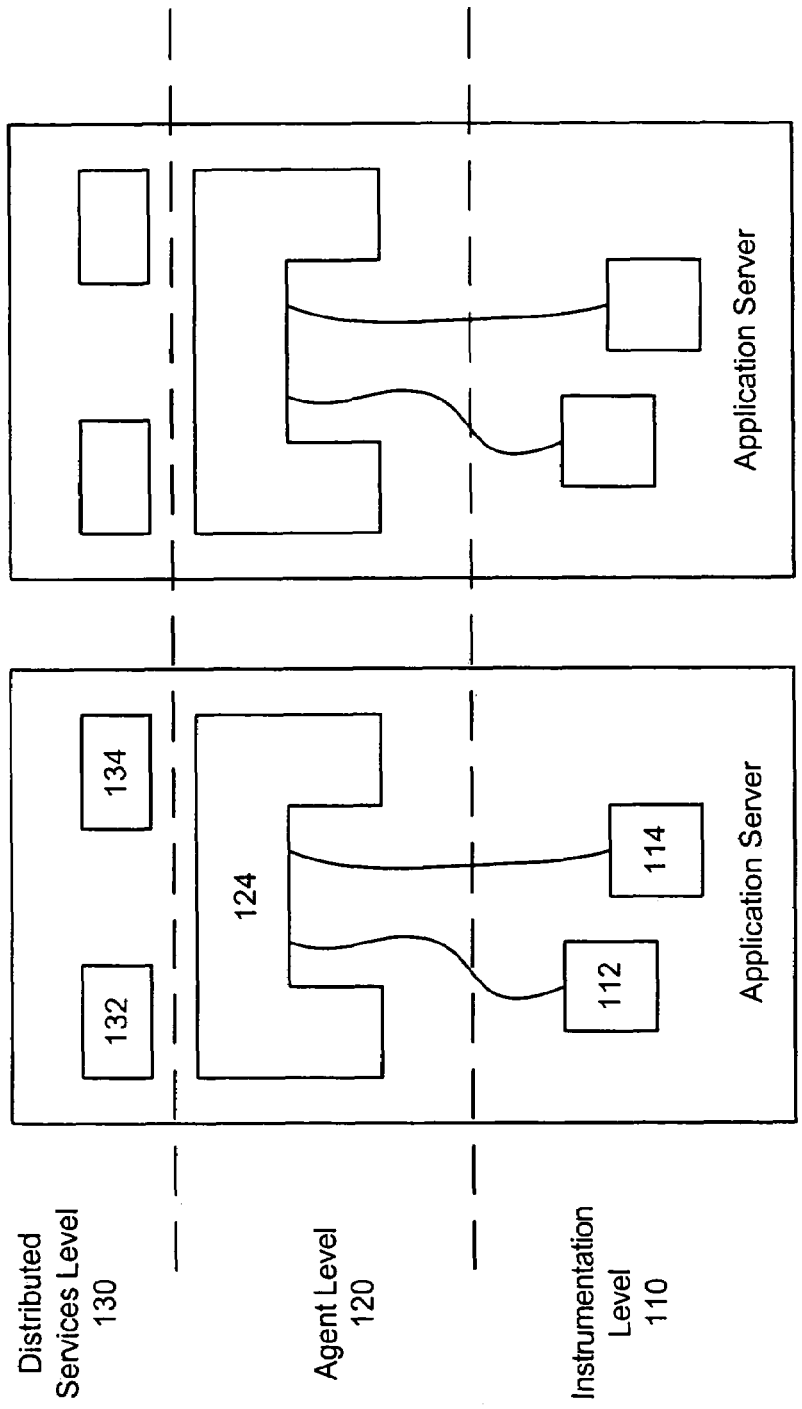
FIG. 1 is a block diagram of selected elements of the management architecture defined by the Java Management eXtensions (JMX) Specification.

To provide Java objects (e.g., monitor beans 516 and runtime beans 518) to various applications 504, 508 and to use bean server 512 for such purposes, applications 504, 508 may be made available via the distributed services level (e.g., distributed services level 130, shown in FIG. 1) of the JMX-based architecture (e.g., JMA 500). For example, well-known protocols such as HTTP may be used to communicate with bean server 512 via an appropriate protocol adapter that may translate operations into representations in a given protocol. In addition, one or more connectors may be used to communicatively couple the applications 504, 508 to bean server 512 using a proprietary protocol.

JMA 500 may be distributed across the three levels of the JMX architecture including a distributed services level, an agent level, and an instrumentation level. The instrumentation level may include, for example, monitor and runtime beans 516, 518. The agent level may include, for example, bean server 512. The distributed services level may include, for example, various applications 540, 508, adaptors, and connectors.

According to one embodiment, various Java resources 520 at the agent level may be included as an external library. A JMX service module (jmx_service) may provide some of the functionality from the distributed services level, and may create an instance of bean server 512 on each of the nodes in one or more clusters and provide local and cluster connections to all of them. Monitor beans 516 may be registered clusterwide. As such, a user or client may work with bean server 512 transparently (e.g., from the user's perspective there may appear to be only one bean sever 512 showing all monitor beans 516 of the cluster). In addition, to receive JMX notifications clusterwide, a notification service module (jmx_notification) may be employed in combination with the JMX service.

Bean server 512 may include a registry of monitor and runtime beans 516-518. Bean server 512 may also serve as a single entry point for calling monitor and runtime beans 516-518 in a uniform fashion from applications 504, 508, to monitor the resources 520, and to collect or gather the monitoring data or information associated with monitored resources 526. According to one embodiment, bean server 512 may reside at a particular Java virtual machine (JVM) and may call registered monitor and runtime beans 516-518 from the same JVM or other JVMs. According to one embodiment, bean server 512 may, in fact, be multiple managed bean servers. According to one embodiment, various modules of monitor service 502 may reside on the same JVM (e.g., with bean server 512). In an alternative embodiment, the various modules of monitor service 502 may reside on separate JVMs.

According to one embodiment, resources 520 including kernel resources, libraries, interfaces, and services may be monitored using the runtime and monitor beans 516-518 registered with the bean server 512. To monitor the resources 520, including arbitrary Java resources, and be manageable, a management interface may be provided, and objects (e.g., monitor bean 516 and runtime bean 518) that implement such management interface may be registered with bean server 512. Bean server 512, as previously described, may then serve as a container for monitor bean 516 and runtime bean 518, and provide them with access to resources 520 to be monitored.

According to one embodiment, runtime bean 518 (also sometimes referred to herein as a "resource" bean) may provide continuous or periodic monitoring of resources 520 and may provide dynamic resource notifications or responses including information regarding resources 520 to each of the monitor beans 516. According to one embodiment, monitor service 502 may retrieve an Extensible Markup Language (XML) file 528, having semantics and installation directives on how monitor tree 514 is created, from database 510 to create monitor tree 514. Monitor tree 514 may then be generated with various nodes, such as node 530. Each of the nodes may include one or more monitor beans 516 associated with one or more resources 526.

According to one embodiment, monitor bean 516 at node 530 may request information regarding its associated resource 526 from the runtime bean 518 associated with the resource. For example, monitor bean 516 may invoke a method or request 522 during runtime to retrieve monitoring data from runtime bean 518, and runtime bean 518 may respond or provide a notification including the requested information 524 to monitor bean 516 regarding associated resource 526. According to another embodiment, information 524 regarding associated resource 526 may be provided periodically as predetermined and pre-set using timer 532. Timer 532 may include predetermined criteria including a predetermined time period for periodically providing information 524 from runtime bean 518 to monitor bean 516.

Monitor service 502 may include an administrative services interface to provide the monitoring data or information to, for example, administrative tools including visual administrator 504. The information received at visual administrator 504 may be displayed using a monitor viewer 506 including a Web-based monitor browser or Graphical User Interface (GUI)-based monitor viewer. Monitor service 502 may include other interfaces, such as a managed enterprise Java beans ("MEJB") interface, to connect to remote third party tools, and a CCMS agent to connect to CCMS 508.

The MEJB of the MEJB interface may be implemented with a session Enterprise Java Bean (EJB). The MEJB may provide local and remote access to a platform's manageable resources through the EJB interoperability protocol. The MEJB may reside in and may be executed in a runtime environment (e.g., MEJB container), which may provide a number of common interfaces and service to the MEJB. The common interfaces and services may include security and transaction support. The MEJB interface may provide future scalability and allow multiple user interfaces to be used, such as a standard Web browser.

The managed beans, such as monitor and runtime beans 516-518, may include the following two logical types of registered managed beans: (1) standard beans and (2) specific beans. Standard beans may provide standard functionality of start/stop, get/set properties, etc. Standard beans may be registered by default for all deployed components (e.g., kernel, libraries, interfaces, and services). Specific beans may provide component-specific functionalities that may vary from one component to another. To interface with a specific bean, a component may register an object that may implement a specific interface to list the processes available for its management and to extend the management interface (e.g., com.company.engine.frame.state.ManagementInterface).

According to one embodiment, for kernel resources, a standard bean may be registered with each manager having a specific bean. A prerequisite for this may be to return a non-null value in a method (e.g., getManagementInterface( )) from the manager interface. For libraries and interfaces, only standard beans may be registered. For services, except for the already registered standard beans, each of the services may register specific beans. Implementation of the management interface may also cause a specific bean to be registered for that particular service.

Figure 6:
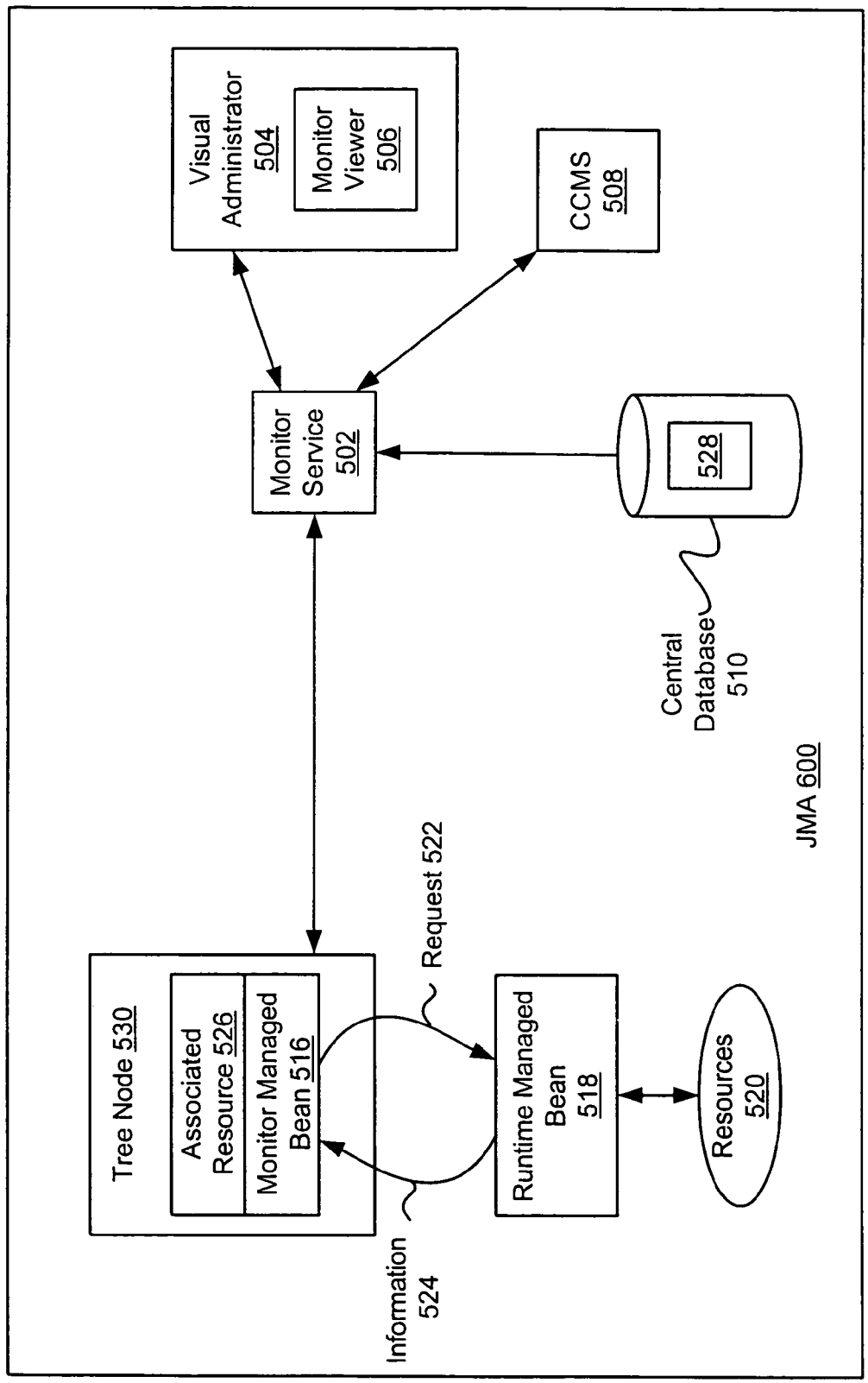
FIG. 6 is a block diagram illustrating an embodiment of a tree node of a monitor tree.

FIG. 6 illustrates an embodiment of tree node 530 of a monitor tree. According to one embodiment, a hierarchical monitor tree (e.g., monitor tree 514, shown in FIG. 5) may be created to provide a grouping of monitoring agents (e.g., monitor bean 516) and resources 526 associated with the monitoring agents, to provide a more manageable monitoring architecture. Although the monitoring agents and their corresponding resources may be grouped in a monitor tree, they are individually represented as tree nodes, and provide individual reporting of each of the resources, releasing the module developer from programmatically reporting the monitoring data to a central location.

For example, according to one embodiment, using the monitor tree, the module developer may configure runtime beans 518 to monitor one or more resources 520 and provide monitoring information 524 to monitor beans 516 at a particular node 530 (or group of nodes). Monitoring information 524 may be provided continuously and/or upon request 522 from monitor bean 516 associated with the underlying resource 526.

Associated resource 526 is associated with a particular monitor bean 516 to individualize the monitoring process (e.g., by receiving monitoring information about a particular resource rather information about all resources). Similarly, according to one embodiment, particular resources 520 may be associated with one or more runtime beans 518 to further individualize the process. Resources 520 may include the kernel, services, interfaces, libraries, and the like, for each of the dispatchers and servers associated with an application server engine (e.g., such as the Java 2 Platform, Enterprise Edition (J2EE) engine 206 described above).

As used herein, a "J2EE server" may include distributed J2EE servers, including, for example, multiple instances of a group of redundant J2EE servers and a dispatcher. Associated resource 526 may refer to one of the resources 520 that is associated with monitor bean 516 at node 530 to, for example, allow monitor bean 516 to request monitoring information from runtime bean 518. The end result is a simplified distribution of monitoring information in the form of a monitor tree with individual nodes, as opposed to a system in which monitoring information must be centralized.

According to one embodiment, monitoring data 524 may then be provided to various client level applications, such as visual administrator 504 and/or CCMS 508 via monitor service 502. According to one embodiment, monitor viewer 506 may be used to view the monitor tree (e.g., monitor tree 514, shown in FIG. 5) and its various tree nodes and the monitoring information associated with the each of the nodes (e.g., node 530 and associated resource 526). A user may select any of the nodes or resources shown as part of the monitor tree to view the monitoring data. According to one embodiment, a color or symbol combination may be used to determine the status of associated resources at various nodes. For example, a red/green/yellow combination may be used wherein, if associated resource 526 at node 530 is in a "normal" state, a green mark may be shown next to it. If associated resource 526 approaches a critical value, the mark may turn yellow and once the associated resource 526 reaches the critical value, the mark may turn red. Additionally, the mark may be of a different color, such as white, when there is inactivity associated with the associated resource 526. However, the underlying principles of the invention are not limited to any particular color scheme.

According to one embodiment, monitor viewer 506 may be used to display other information related to the resources 520 including, for example, the name of the resource, the resource description, the resource type, relevant dates and/or time, resource properties and values. The information may also include data history regarding the resources 520. The data history may include, for example, values associated with the resource over different periods of time (e.g., over a minute, hour, day, . . . etc).

As mentioned above, according to one embodiment, XML file 528 may be retrieved by monitor service 502 from central database 510 to generate monitor tree 514. The XML file may include semantics and directives to generate the monitor tree using monitor service 502. An XML parser may be used to parse the semantics and directives of the XML file. Furthermore, a Java Management Extensions (JMX)-based application programming interface (API) may be used to create and customize the monitor tree. The monitor API may facilitate and handle both (1) the creation of the monitor tree and (2) the customization of the monitor tree as will as the reporting of the monitoring information and values. Typically, an API refers to a language or message format used by an application program to communicate with the operating system, communications protocols, and/or with other control programs (e.g., database management systems).

Figure 7:
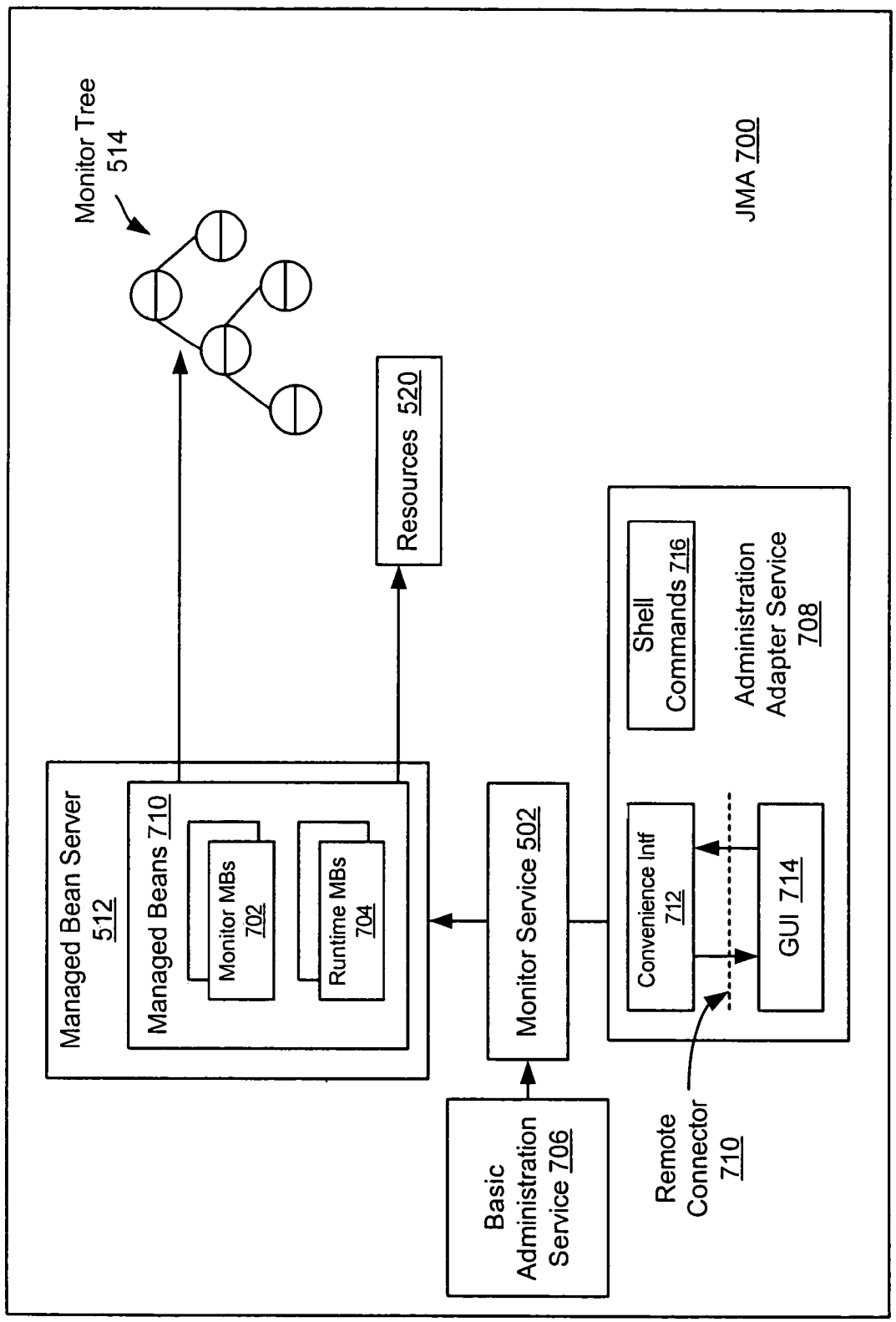
FIG. 7 is a block diagram illustrating an embodiment of a Java monitoring architecture having administration services.

FIG. 7 is a block diagram illustrating an embodiment of a Java monitoring architecture having administration services. According to one embodiment, Java monitoring architecture (JMA) 700 may include a set of administration services 706-708 to provide a number of services for various components and modules of JMA 700. As illustrated, JMA 700 may include basic administration service (<basicadmin> or "basic service") 706 and administration adapter service (<adminadapter> or "adapter service") 708.

Along with providing instrumentation of certain modules and components (e.g., libraries and interfaces), basic service 706 may also provide and facilitate registration of managed beans (beans) 710 with managed bean server (bean server) 512 via monitor service 502. Beans 710 may include monitor managed beans (monitor beans) 702 (including, e.g., monitor bean 516, shown in FIG. 5) and runtime managed beans (runtime beans or resource beans) 704 (including, e.g., runtime bean 518, shown in FIG. 5).

According to one embodiment, monitor beans 702 registered with bean server 512 using basic service 706 may be used for individual tree nodes (nodes) of monitor tree 514. Each of the monitor beans 702 may be used for reboot and shutdown, as well as for defining the type of nodes (e.g., dispatcher or server type nodes) and the resources associated with each of the nodes, for which monitoring information may be retrieved from runtime beans 704. Runtime beans 704 may be used for monitoring of all clusters and resources 520.

Basic service 706 may provide registration for the following two logical types of beans 710: (1) standard beans and (2) specific beans. Standard beans may provide standard functionality of start/stop, get/set properties, etc. Standard beans may be registered by default for all deployed components or resources (e.g., kernel, libraries, interfaces, and services). Specific beans may provide component-specific functionalities that may vary from one component to another. To have specific beans, a component may register an object that may implement a specific interface to list the processes available for its management and to extend the management interface (e.g., com.company.engine.frame. state.ManagementInterface).

For kernel resources, a standard bean may be registered with each manager having a specific bean. A prerequisite for this may be to return a non-null value in a method (e.g., getManagementInterface( )) from the manager interface. For libraries and interfaces, only standard beans may be registered. For services, except for the already registered standard beans, each of the services may register specific beans, and implementation of the management interface may also cause a specific bean to be registered for that particular service.

Adapter service 708 may be part of the distributed services level of JMA 700. Adapter service 708 may include or provide the following: (1) remote connector 710; (2) convenience interface 712; (3) swing-based Graphical User Interface (GUI) 714; and (4) shell commands 716. By having remote connector 710, adapter service 708 may allow users to have remote access to the bean server 512 and seek monitoring information relating to one or more resources 520.

Convenience interface 712 may allow users to remotely access bean server 512 using remote administration tools. Remotely accessing bean server 512 may include remotely accessing and working with beans 702 as registered by basic service 706 based on the semantics of resources 520 that are instrumented and monitored by these beans 702. Stated differently, adapter service 708 provides a high-level view to bean server 512. The high-level view may be represented by a monitor tree, such as monitor tree 514. Furthermore, adapter service 708 may retrieve monitor tree 514 and provide interfaces to manage each type of node in monitor tree 514. By way of example, the node types within the monitor tree may include a root node representing the cluster ("TYPE_CLUSTER_MBEAN"), a basic cluster node type representing a node within the cluster ("TYPE_CLUSTER_NODE_MBEAN"), a standard MBean that instruments the kernel of a cluster node ("TYPE_KERNEL_MBEAN"), a standard MBean that instruments a service ("TYPE_SERVICE_MBEAN"), a standard MBean that instruments a library ("TYPE_LIBRARY_MBEAN"), a standard MBean that instruments an interface ("TYPE_INTERFACE_MBEAN"), a standard MBean that instruments a defined group of clusters ("TYPE_GROUP"), and all other MBeans ("TYPE_UNSPECIFIED_MBEAN"). It should be noted, however, that the underlying principles of the invention are not limited to any particular set of MBean types.

Swing-based GUI 714 may use convenience interface 712 and monitor tree 514 to represent the management functionality of JMA 700 to a human administrator. The console counterpart of the GUI administrator may consist of various shell commands 716 that may be grouped together in an administration command group.

Figure 8:
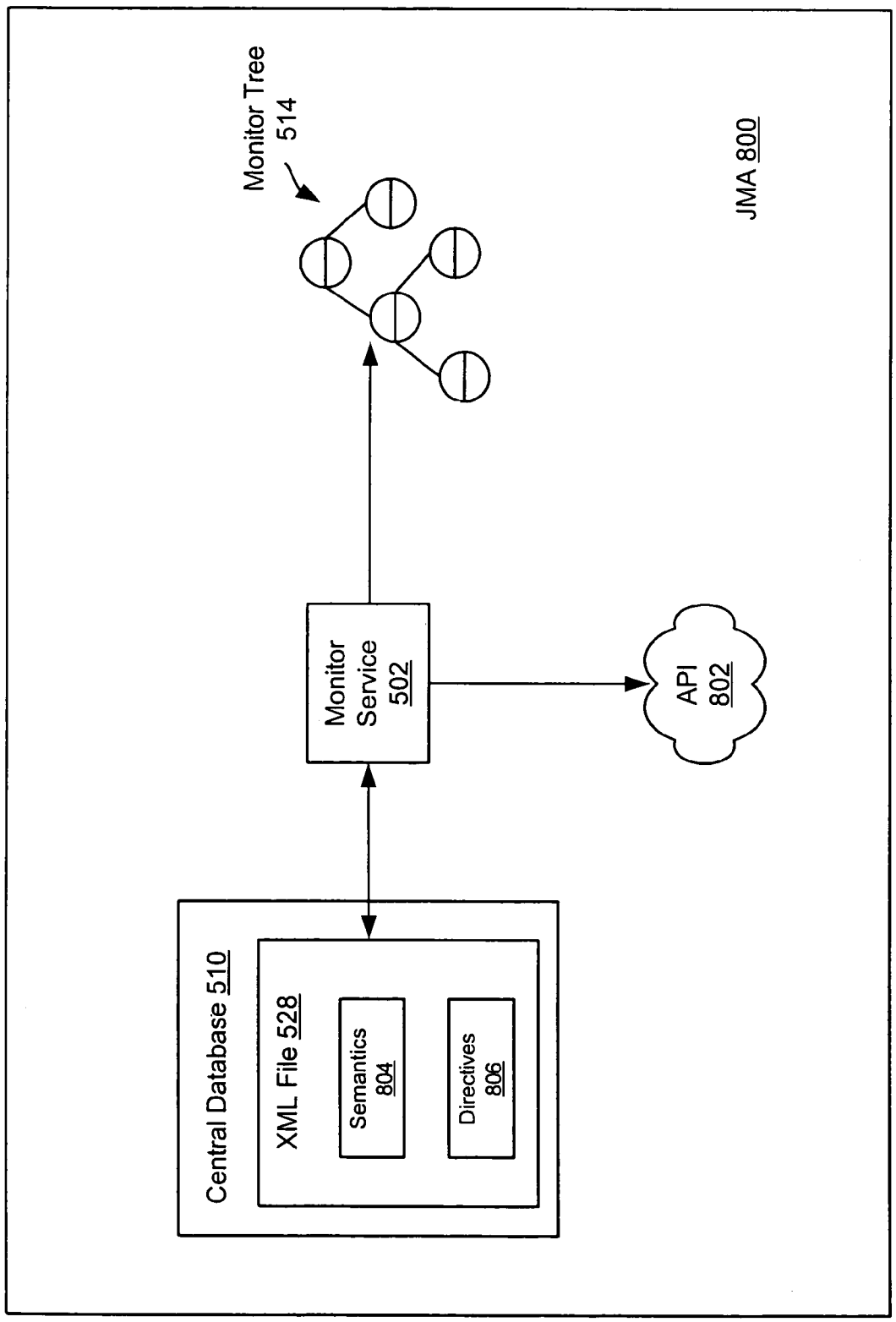
FIG. 8 is a block diagram illustrating an embodiment of Java monitoring architecture having an Extensible Markup Language file.

FIG. 8 is a block diagram illustrating an embodiment of Java monitoring architecture having an Extensible Markup Language ("XML") file. According to one embodiment, monitor service 502 of Java monitoring architecture 800 may help generate a monitor tree, such as monitor tree 514, based on semantics 804 and directives 806 of XML file 528. Monitor service 502 may retrieve XML file 528 from a database (e.g., central database 510, shown in FIG. 5).

The XML technology may be integrated with a Java 2 Platform Enterprise Edition (J2EE) engine (J2EE) (e.g., J2EE 206, shown in FIG. 2) for electronic data interchange, due to XML's characteristics of being broad and relatively easy to use. To support and build the XML technology, including XML file 528, in the J2EE engine, a number of application programming interfaces (APIs), such as API 802, may be employed to use XML file 528 to configure various components and application modules. For example, XML file 528 may be used to facilitate components and modules of monitor service 502 to generate monitor tree 514.

According to one embodiment, API 802 may be a Java Management Extensions (JMX)-based API. Examples of Java APIs include, for example, J2EE XML API, Java API for XML Processing (JAXP), Java Messaging Service (JMS) API, Java API for XML Messaging (JAXM), Java Transaction API (JTA), Java API for XML-Remote Procedure Call (JAX-RPC), Java API XML Binding (JAXB), and Java API for XML Registries (JAXR). API 802 may facilitate and handle both (1) the creation of monitor tree 514 and (2) the customization of monitor tree 514 as will as the reporting of the monitoring information and values. Typically, an API refers to a language or message format used by an application program to communicate with the operating system, communications protocols, and/or with other control programs (e.g., database management systems). According to one embodiment, multiple XML files may be used and similarly, multiple APIs may be used to generate monitor tree 514.

According to one embodiment, XML file 528 may include semantics 804 and directives 806 to help monitor service 502 with generating monitor tree 514. Semantics 804 of XML file 828 may include information about monitor tree 514, the monitor managed beans (monitor beans), and the resources to be monitored. Semantics 804 may include a code or a set of instructions for generating monitor tree 514. The set of instructions may include, for example, the instructions for setting the color-coded marks representing the corresponding status of the resources. For example, a green mark may indicate monitoring of the corresponding resource. A yellow mark may indicate continuous monitoring of the corresponding resource and may also indicate that the resource being monitored may be reaching a critical value or stage. A red mark may indicate that the corresponding resource may have reached a critical value. Finally, a white mark may indicate inactivity or that the corresponding resource is not being monitored.

According to one embodiment, directives 806 may specify the form in which monitor tree 514 may be generated. Stated differently, directives 806 may provide installation instructions for how semantics 804 are to be implemented. For example, directives 806 may include one or more templates to match various monitor beans with corresponding associated resources at various nodes of monitor tree 814. Monitor service 502 may use API 802 to use semantics 804 and directives 806 together to generate monitor tree 514.

Semantics 804 and directives 806 of XML file 528 may include elements (e.g., similar to HyperText Markup Language (HTML) tags) to provide context to the information (e.g., semantics 804 and directives 806) of XML file 528. XML file 528 may be document-centric to be used by humans or data-centric to be used by another software application or module containing data extracted from a database, such as central database 510, and may be submitted to API 802. XML file 528 may include the following components: (1) a prologue at the beginning of XML file 528; (2) elements or sequences of elements, as described above, containing data or other elements similar to the HTML tags; and (3) attributes associated with each of the elements to further qualify the elements.

Figure 9:
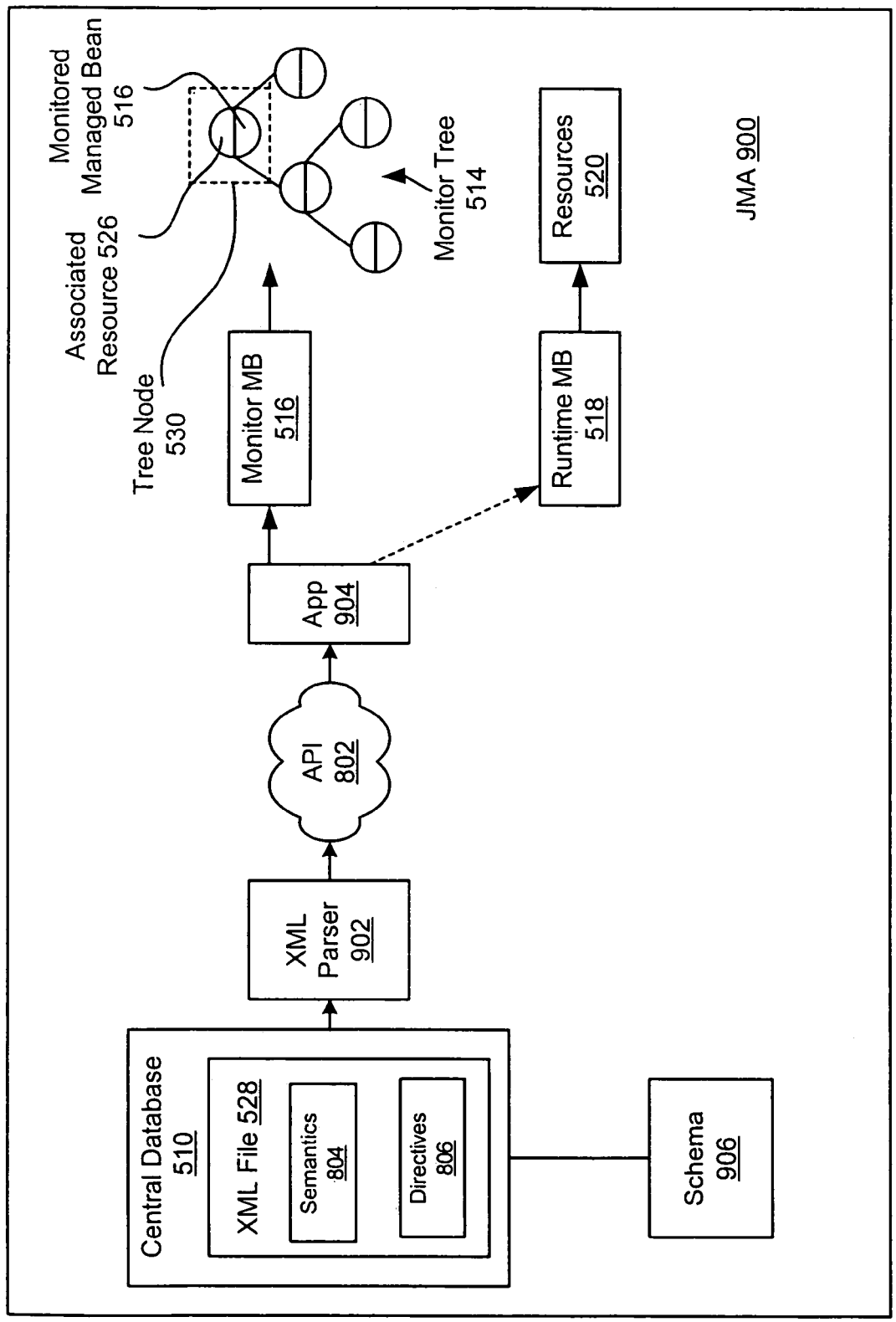
FIG. 9 is a block diagram illustrating an embodiment of Java monitoring architecture having an Extensible Markup Language file.

FIG. 9 illustrates additional details associated with the interpretation of XML file 528. To efficiently use XML file 528 for generating monitor tree 514, XML file 528 may be parsed. Stated differently, semantics 804, directives 806, and other components of XML file 528 may be parsed using an application known as XML parser (or XML processor) 902. XML file 528 and schema (or scheme or plan) 906, if any, associated with XML file 528 may be put into XML parser 902 for parsing of the information (e.g., semantics 804 and directives 806) contained in XML file 528, and for organizing, formatting, and validating of the information. XML parser 902 may check schema 906 to determine whether XML file 528 is of proper form and check the schema 906 to determine whether XML file 528 is valid as defined by the contents of the schema 906.

XML parser 902 may provide or include an application with access to the elements (as described with reference to FIG. 8) of XML file 528 to establish a link between XML file 528 and other components or modules, such as the application programming interface (API) 802, of JMA 900. According to one embodiment, API 802 may be used to further comprehend, develop, manipulate, and use XML file 528 for the purposes of implementation of XML file 528. API 802 may be used separately or in combination with XML parser 802. In an embodiment, API 802 may be part of XML parser 902. API 802 and XML parser 902 may provide another application or module, such as the application/module (application) 904, to transform the XML file into its resulting and intended application including the monitor tree 514.

Application 904 may help facilitate the assignment of various monitor beans, including monitor bean 516, with their associated resources, including associated resource 526, at various nodes, including node 530. According to one embodiment, for the purposes of customizing monitor tree 514, API 802 may include a bootstrapper. The bootstrapper may include a code or a sequence of codes to initiate a relationship between a component agent and monitor bean 516. The customizing may refer to customizing monitor tree 514 according to the customizing data (e.g., thresholds, descriptions, etc.) that may be registered along with monitor bean 516.

According to one embodiment, application 904 may also be used to help facilitate the assignment of various runtime beans 518, with various resources. For example, application 904 may help runtime bean 518 implement a certain communication interface, based on a required or predetermined monitoring logic, coupled with the resources 520, using a component agent. The monitoring information from the resource 520 may be reported by runtime bean 518 to the component agent which may be later reported to monitor bean 516. A notification system may be employed for maintaining event-based communication between the component agent and runtime bean 518 when the monitoring data from the resources 520 becomes available.

XML file 528 may be parsed in several ways including using the Document Object Model (DOM), which reads the entire XML file 528 and forms a tree like structure, or using the Simple API for XML (SAX), which is regarded as an event-driven parser that reads XML file 528 in segments. API 802 may be a Java Management Extensions (JMX)-based API. Examples of Java or JMX-based APIs include J2EE XML API, Java API for XML Processing (JAXP), Java Messaging Service (JMS) API, Java API for XML Messaging (JAXM), Java Transaction API (JTA), Java API for XML-Remote Procedure Call (JAX-RPC), Java API XML Binding (JAXB), and Java API for XML Registries (JAXR).

Figure 10:
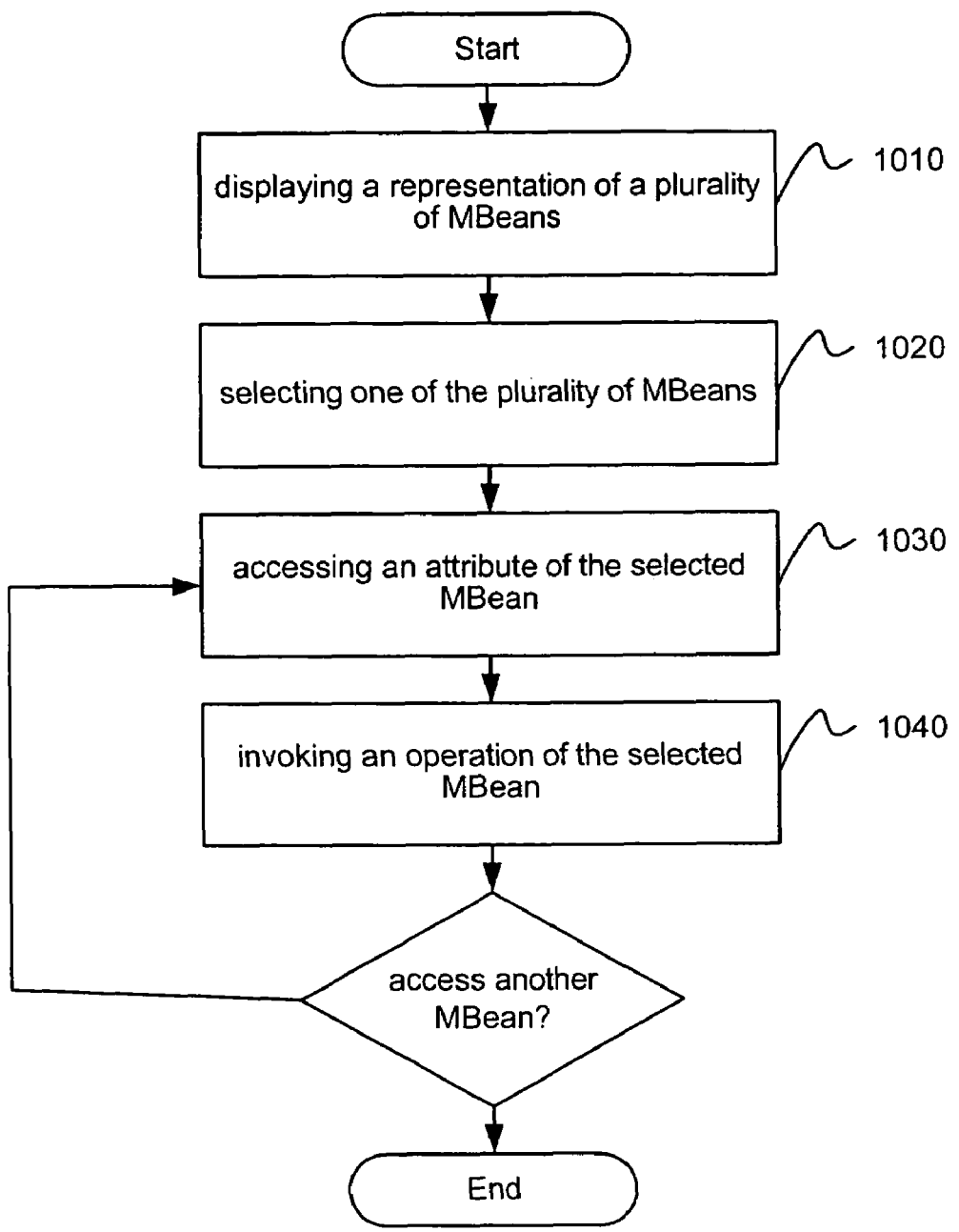
FIG. 10 is a flow diagram illustrating certain aspects of a method for accessing and manipulating an MBean with a graphical user interface.

Turning now to FIG. 10, the particular methods associated with embodiments of the invention are described in terms of computer software and hardware with reference to a flowchart. The methods to be performed by a visual administrator providing Java management bean support may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 10 is a flow diagram illustrating certain aspects of a method for accessing and manipulating an MBean using a graphical user interface. Referring to process block 1010, a representation of a plurality of MBeans is displayed on a graphical user interface of a computing device (e.g., using visual administrator 504, shown in FIG. 5). In one embodiment, the computing device is part of a network having a cluster of application servers. The term "cluster of application servers" refers to a plurality of application servers organized into a cluster architecture (e.g., the cluster architecture illustrated in FIG. 12). In such an embodiment, each of the displayed MBeans represents a manageable resource the cluster of application servers.

In an embodiment, the plurality of MBeans are organized as a tree structure having a root node (e.g., monitor tree 514, shown in FIG. 5). In one embodiment, the root node is an MBean representing the cluster of application servers. The tree structure may include one or more server nodes depending from the root node. In such an embodiment, each server node may be an MBean representing a server within the cluster of application servers.

In one embodiment, each server node may have a depending kernel node. The term "kernel" refers to a fundamental part of a program that provides basic services. In such an embodiment, the kernel node is an MBean representing the kernel of the server node from which it depends. In an embodiment, a library node depends from at least one of the server nodes. In such an embodiment, the library node may represent a library of the server from which it depends. The term "library" refers to set of software routines (or functions) that may be accessed by a program.

In an embodiment, the tree structure may include a service node depending from at least one of the one or more server nodes. In such an embodiment, the service node may represent a service of the server from which in depends. The term "service" refers to functionality derived from a particular software program. The functionality provided by a service may include, and is not limited to, lifecycle management, security, connectivity, transactions, and/or persistence.

Referring to process block 1020, the graphical user interface may be used to select one of the plurality of MBeans. In an embodiment, "selecting an MBean" refers to receiving an indication from a pointing device that an MBean has been selected. Similarly, "selecting an MBean" may refer to receiving an indication from a keyboard that an MBean has been selected.

Referring to process block 1030, the graphical user interface (GUI) may access an attribute of the selected MBean. As described above, MBeans may have one or more attributes.

Examples of attributes include items of information that are exposed for monitoring purposes, state information about an MBean, and/or arguments provided to an MBean. In one embodiment, a GUI within a visual administrator (e.g., monitor viewer 506, shown in FIG. 5) may interface with a monitor service (e.g., monitor service 502, shown in FIG. 5) to access an attribute of a selected MBean (e.g., tree node 530, shown in FIG. 5).

Referring to process block 1040, the GUI may invoke an operation of the selected MBean. As described above, the term "operation" may refer to a process that an object (e.g., an MBean) performs. In an embodiment, the selected MBean may perform operations such reading a monitored value, changing a threshold value, starting a process, stopping a process, resetting a value to null, etc. In one embodiment a GUI within a visual administrator (e.g., monitor viewer 506, shown in FIG. 5) may interface with a monitor service (e.g., monitor service 502, shown in FIG. 5) to invoke an operation of the selected MBean (e.g., tree node 530, shown in FIG. 5).

Figure 11:
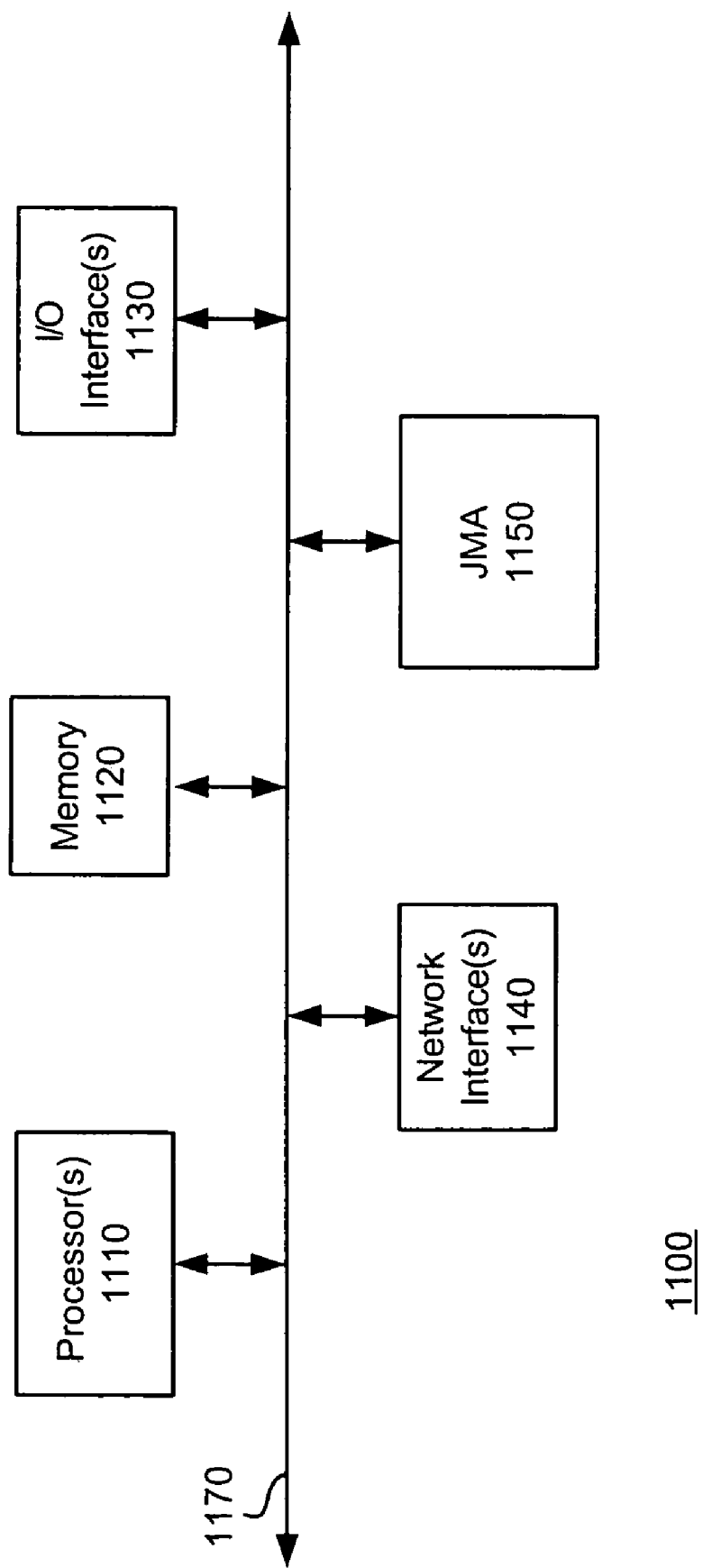
FIG. 11 is a block diagram of computing device 1100 implemented according to an embodiment of the invention.

FIG. 11 is a block diagram of computing device 1100 implemented according to an embodiment of the invention. Computing device 1100 may include: processor(s) 1110, memory 1120, one or more Input/Output interfaces 1130, network interface(s) 1140, and Java monitoring architecture (JMA) 1150. The illustrated elements may be connected together through system interconnection 1170. Processor(s) 1110 may include a microprocessor, microcontroller, field programmable gate array (FPGA), application specific integrated circuit (ASIC), central processing unit (CPU), programmable logic device (PLD), and similar devices that access instructions from system storage (e.g., memory 1120), decode them, and execute those instructions by performing arithmetic and logical operations.

JMA 1150 enables computing device 1100 to access and manipulate an MBean with a graphical user interface. JMA 1150 may be executable content, control logic (e.g., ASIC, PLD, FPGA, etc.), firmware, or some combination thereof, in an embodiment of the invention. In embodiments of the invention in which JMA 1150 is executable content, it may be stored in memory 1120 and executed by processor(s) 1110.

Memory 1120 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1120 may also include one or more hard disks, floppy disks, ZIP disks, compact disks (e.g., CD-ROM), digital versatile/video disks (DVD), magnetic random access memory (MRAM) devices, and other computer readable media that store instructions and/or data. Memory 1120 may store program modules such as routines, programs, objects, images, data structures, program data, and other program modules that perform particular tasks or implement particular abstract data types that facilitate system use.

One or more I/O interfaces 1130 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1170 permits communication between the various elements of computing device 1100.

In one embodiment of the invention, the management techniques which are the focus of this application are used to manage resources within a cluster of server nodes. An exemplary application server architecture will now be described, followed by a detailed description of the management architecture and associated processes.

Figure 12:
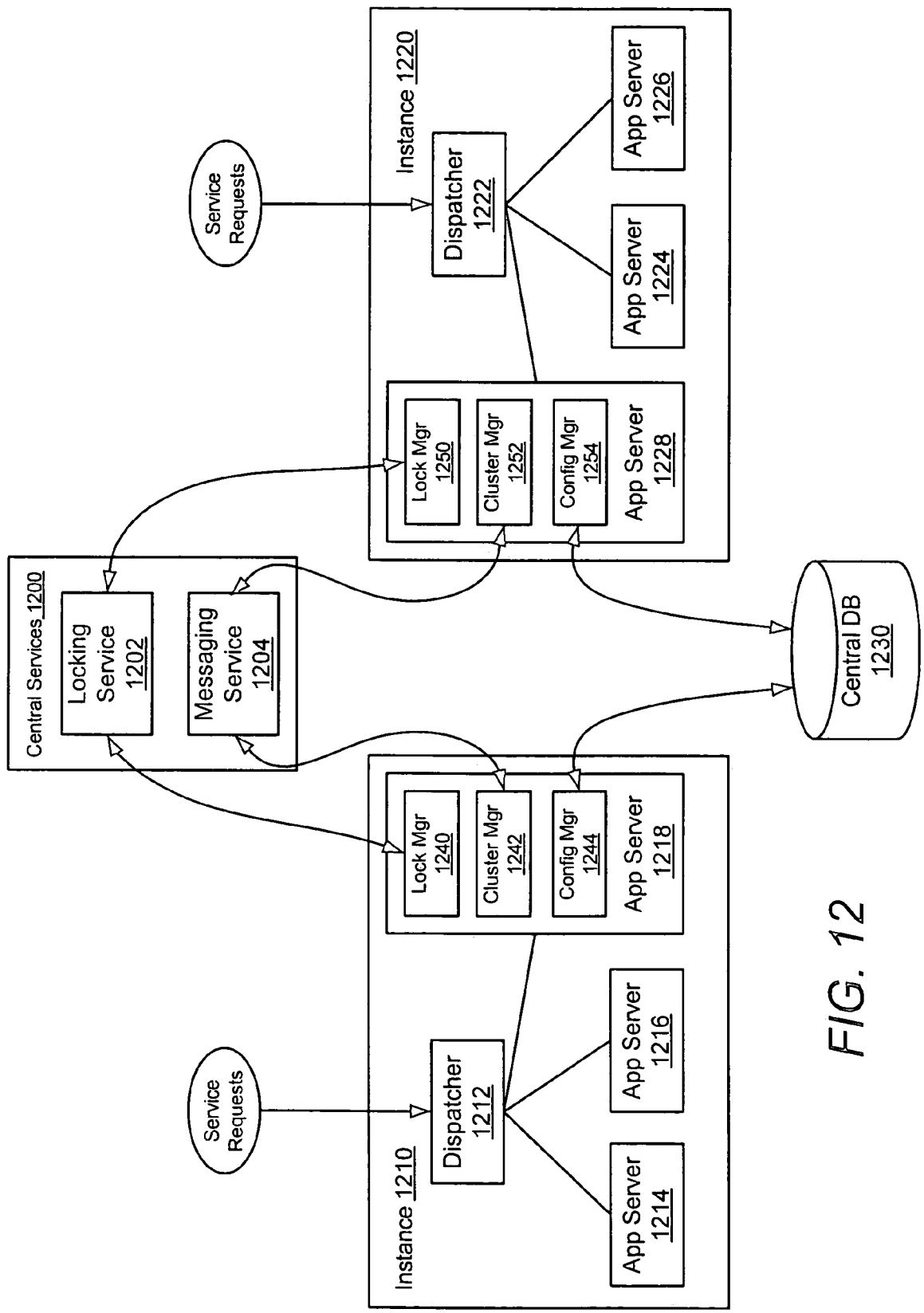
FIG. 12 is a block diagram illustrating an embodiment of an application server architecture.

An application server architecture employed in one embodiment of the invention is illustrated in FIG. 12. The architecture includes central services "instance" 1200 and a plurality of application server "instances" 1210, 1220. As used herein, application server instances, 1210 and 1220, each include a group of server nodes 1214, 1216, 1218 and 1224, 1226, 1228, respectively, and a dispatcher, 1212, 1222, respectively. Central services instance 1200 includes locking service 1202 and messaging service 1204 (described below). The combination of all of the application instances 1210, 1220 and central services instance 1200 is referred to herein as a "cluster." Although the following description will focus solely on instance 1210 for the purpose of explanation, the same principles apply to other instances such as instance 1220.

Server nodes 1214, 1216, 1218 within instance 1210 provide the business and/or presentation logic for the network applications supported by the system. Each of the server nodes 1214, 1216, 1218 within a particular instance 1210 may be configured with a redundant set of application logic and associated data. In one embodiment, dispatcher 1212 distributes service requests from clients to one or more of server nodes 1214, 1216, 1218 based on the load on each of the servers. For example, in one embodiment, a dispatcher implements a round-robin policy of distributing service requests (although various alternate load balancing techniques may be employed).

In one embodiment of the invention, server nodes 1214, 1216, 1218 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of instances 1210 and 1220 is enabled via central services instance 1200. As illustrated in FIG. 12, central services instance 1200 includes messaging service 1204 and locking service 1202. Message service 1204 allows each of the servers within each of the instances to communicate with one another via a message passing protocol. For example, messages from one server may be broadcast to all other servers within the cluster via messaging service 1204. In addition, messages may be addressed directly to specific servers within the cluster (e.g., rather than being broadcast to all servers).

In one embodiment, locking service 1202 disables access to (i.e., locks) certain specified portions of configuration data and/or program code stored within a central database 1230. Locking managers 1240 and 1250 employed within the server nodes lock data on behalf of various system components which need to synchronize access to specific types of data and program code (e.g., such as the configuration managers 1244 and 1254). As described in detail below, in one embodiment, locking service 1202 enables a distributed caching architecture for caching copies of server/dispatcher configuration data.

In one embodiment, messaging service 1204 and locking service 1202 are each implemented on dedicated servers. However, messaging service 1204 and the locking service 1202 may be implemented on a single server or across multiple servers while still complying with the underlying principles of the invention.

As illustrated in FIG. 12, each server node (e.g., 1218, 1228) includes a lock manager 1240, 1250 for communicating with locking service 1202; a cluster manager 1242, 1252 for communicating with messaging service 1204; and a configuration manager 1244, 1254 for communicating with central database 1230 (e.g., to store/retrieve configuration data). Although lock managers 1240 and 1250, cluster managers 1242 and 1252, and configuration managers 1244 and 1254 are illustrated with respect to particular server nodes, 1218 and 1228, in FIG. 12, each of the server nodes 1214, 1216, 1224 and 1226 and/or on the dispatchers 1212, 1222 may be equipped with equivalent lock managers, cluster managers and configuration managers.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method employed within a network of application server instances having a cluster architecture, comprising:

registering a plurality of management beans (MBeans) with an MBean server, the MBean server providing the MBeans with access to manageable resources of application server instances within a cluster of application server instances, the manageable resources being monitored by the MBeans;

displaying a representation of the plurality of management beans (MBeans) registered with the MBean server on a graphical user interface of a computing device, the registered MBeans including monitor MBeans and runtime MBeans, the monitor MBeans retrieving monitoring data from the runtime MBeans and the runtime MBeans providing the monitoring data to the monitoring MBeans, wherein each of the displayed MBeans represents a manageable resource of an application server instance within the cluster of application server instances;

monitoring the manageable resources within the cluster, including the monitor MBean retrieving the monitoring data regarding the manageable resources within the cluster from the runtime MBeans associated with the manageable resources;

selecting one of the plurality of MBeans displayed in the graphical user interface; and accessing an attribute of the selected MBean with the graphical user interface to view the retrieved monitoring data regarding the manageable resource represented by the selected MBean.

2. The method of claim 1, wherein displaying the representation of the plurality of MBeans comprises:

displaying a representation of a plurality of hierarchically organized MBeans.

3. The method of claim 2, wherein displaying the representation of the plurality of hierarchically organized MBeans comprises:

displaying a representation of a plurality of MBeans organized as a tree structure having a root node.

4. The method of claim 3, wherein the root node is an MBean representing the cluster of application server instances.

5. The method of claim 4, wherein the tree structure further includes one or more server nodes depending from the root node, wherein each depending server node is an MBean representing a corresponding one of the server nodes configured with the redundant set of application logic and associated data in the group of server nodes for an application server instance in the cluster, each application server instance within the cluster of application server instances having a group of server nodes configured with a redundant set of application logic and associated data, each server node within the group of server nodes having access to a central database associated with the cluster of application server instances, and a dispatcher in communication with a central service associated with the cluster of application server instances, the central service having a locking service and a messaging service, the locking service enabling synchronization by disabling access to a portion of configuration data and program code stored within the central database, the messaging service enabling communication among the groups of server nodes within each application server instance within the cluster of application server instances using a message passing protocol.

6. The method claim 5, wherein the tree structure further includes a kernel node depending from each of the one or more depending server nodes, wherein the kernel node is an MBean representing a kernel of the corresponding server node which the depending server node represents.

7. The method of claim 5, wherein the tree structure further includes a library node depending from at least one of the one or more depending server nodes, wherein the library node is an MBean representing a library of the corresponding server node which the depending server node represents.

8. The method of claim 5, wherein the tree structure further includes a service node depending from at least one of the one or more depending server nodes, wherein the service node is an MBean representing a service of the corresponding server node which the depending server node represents.

9. The method of claim 1, wherein identifying one of the plurality of displayed MBeans comprises:

selecting one of the plurality of displayed MBeans with a pointing device.

10. The method of claim 1, wherein identifying one of the plurality of displayed MBeans comprises:
  selecting one of the plurality of displayed MBeans with a keyboard.

11. The method of claim 1, wherein accessing the attribute of the selected MBean with the graphical user interface comprises:
  accessing an attribute of an MBean representing a cluster manager of the network.

12. The method of claim 11, wherein accessing the attribute of the selected MBean representing the cluster manager comprises:
  accessing a queue size attribute of the MBean to determine a number of requests waiting in a queue.

13. The method of claim 1, further comprising:
  invoking an operation of the selected MBean with the graphical user interface.

14. An apparatus comprising:
  a graphical user interface;
  a processor and logic executable thereon to
    register a plurality of management beans (MBeans) with an MBean server, the MBean server providing the MBeans with access to manageable resources of application server instances within a cluster of application server instances, the manageable resources being monitored by the MBeans;
    display a representation of the plurality of management beans (MBeans) registered with the MBean server on the graphical user interface, the registered MBeans including monitor MBeans and runtime MBeans, the monitor MBeans retrieving monitoring data from the runtime MBeans and the runtime MBeans providing the monitoring data to the monitoring MBeans, wherein each of the displayed MBeans represents a manageable resource within the cluster of application server instances;
    monitor the manageable resources within the cluster, including the monitor MBean retrieving the monitoring data regarding the manageable resources within the cluster from the runtime MBeans associated with the manageable resources;
    select one of the plurality of MBeans displayed on the graphical user interface; and
    access an attribute of the selected MBean with the graphical user interface to view the retrieved monitoring data regarding the manageable resource represented by the selected MBean.

15. The apparatus of claim 14, wherein the processor and logic executable thereon to display the representation of the plurality of MBeans registered with the MBean server further comprises a processor and logic executable thereon to
  display a representation of a plurality of MBeans organized as a tree structure having a root node.

16. The apparatus of claim 14, wherein the processor and logic executable thereon to access the attribute of the selected MBean with the graphical user interface further comprises a processor and logic executable thereon to
  access an attribute of an MBean representing a cluster manager of the network.

17. The apparatus of claim 14, wherein the processor and logic executable thereon further comprises a processor and logic executable thereon to
  invoke an operation of the selected MBean with the graphical user interface.

18. A system comprising:
  a means for registering a plurality of management beans (MBeans) with an MBean server, the MBean server providing the MBeans with access to manageable resources of application server instances within a cluster of application server instances, the manageable resources being monitored by the MBeans;
  a means for displaying a representation of the plurality of management beans (MBeans) registered with the MBean server, the registered MBeans including monitor MBeans and runtime MBeans, the monitor MBeans retrieving monitoring data from the runtime MBeans and the runtime MBeans providing the monitoring data to the monitoring MBeans, wherein each of the displayed MBeans represents a manageable resource of an application server instance within the cluster of application server instances;
  a means for monitoring the manageable resources within the cluster, including a monitor MBean means for retrieving the monitoring data regarding the manageable resources within the cluster from the runtime MBeans associated with the manageable resources;
  a means for selecting one of the plurality of MBeans from the displayed representation of the plurality of MBeans; and
  a means for accessing an attribute of the selected MBean from the displayed representation of the plurality of MBeans to view the retrieved monitoring data regarding the manageable resource represented by the selected MBean.

19. The system of claim 18, wherein the means for displaying the representation of the plurality of MBeans comprises:
  a means for displaying a representation of a plurality of MBeans organized as a tree structure having a root node.

20. The system of claim 18, wherein the means for accessing the attribute of the selected MBean comprises:
  a means for accessing an attribute of an MBean representing a cluster manager of the network.

21. The system of claim 20, further comprising:
  a means for invoking an operation of the selected MBean.

22. An article of manufacture comprising:
  a computer-readable medium providing instructions that, when executed by an apparatus, cause the apparatus to
  register a plurality of management beans (MBeans) with an MBean server, the MBean server providing the MBeans with access to manageable resources of application server instances within a cluster of application server instances, the manageable resources being monitored by the MBeans;
  display a representation of the plurality of management beans (MBeans) registered with the MBean server on a graphical user interface of a computing device, the registered MBeans including monitor MBeans and runtime MBeans, the monitor MBeans retrieving monitoring data from the runtime MBeans and the runtime MBeans providing the monitoring data to the monitoring MBeans, wherein each of the displayed MBeans represents a manageable resource of an application server instance within the cluster of application server instances;
  monitor the manageable resources within the cluster, including the monitor MBean retrieving the monitoring data regarding the manageable resources within the cluster from the runtime MBeans associated with the manageable resources;
  select one of the plurality of MBeans displayed in the graphical user interface; and access an attribute of the selected MBean with the graphical user interface to view the retrieved monitoring data regarding the manageable resource represented by the selected MBean.

23. The article of manufacture of claim 22, wherein the instructions that, when executed by the apparatus, cause the apparatus to display the representation of the plurality of MBeans registered with an MBean server on the graphical user interface further cause the apparatus to display a representation of a plurality of hierarchically organized MBeans.

24. The article of manufacture of claim 23, wherein the instructions that, when executed by the apparatus, cause the apparatus to display the representation of the plurality of hierarchically organized MBeans further cause the apparatus to display a representation of a plurality of MBeans organized as a tree structure having a root node.

25. The article of manufacture of claim 22, wherein the instructions that, when executed by the apparatus, cause the apparatus to access the attribute of the selected MBean with the graphical user interface further cause the apparatus to access an attribute of an MBean representing a cluster manager of the network.

26. The article of manufacture of claim 22, wherein the computer-readable medium providing instructions that, when executed by an apparatus, further cause the apparatus to invoke an operation of the selected MBean with the graphical user interface.

* * * * *

UNITED STATES PATENT AND TRADEMARK OFFICE
CERTIFICATE OF CORRECTION

| | | |
|---|---|---|
| PATENT NO. | : 7,661,066 B2 | Page 1 of 1 |
| APPLICATION NO. | : 10/814915 | |
| DATED | : February 9, 2010 | |
| INVENTOR(S) | : Petrov et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Twenty-eighth Day of December, 2010

David J. Kappos
*Director of the United States Patent and Trademark Office*